J. PIERPONT.
Plow.

No. 44,745.

Patented Oct. 18, 1864.

Witnesses:

Inventor:

UNITED STATES PATENT OFFICE.

JOSHUA PIERPONT, OF LA HARPE, ILLINOIS.

IMPROVEMENT IN PLOWS.

Specification forming part of Letters Patent No. 44,745, dated October 18, 1864.

*To all whom it may concern:*

Be it known that I, JOSHUA PIERPONT, of La Harpe, in the county of Hancock and State of Illinois, have invented a new and Improved Plow; and I do hereby declare that the following is a full, clear, and exact description thereof, which will enable others skilled in the art to make and use the same, reference being had to the accompanying drawings, making a part of this specification, in which—

Figure 1:
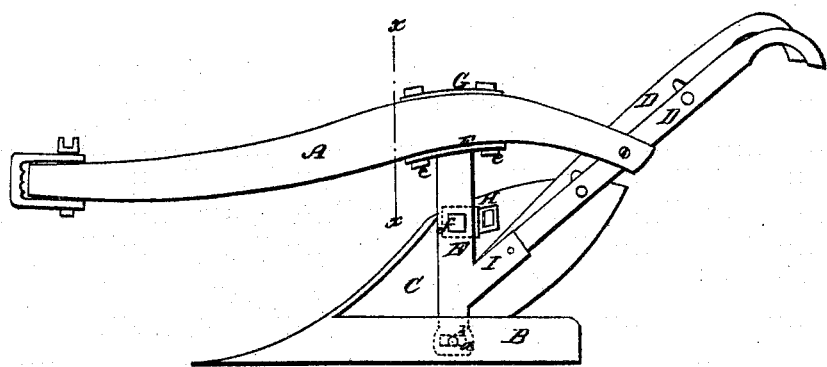
Figure 2:
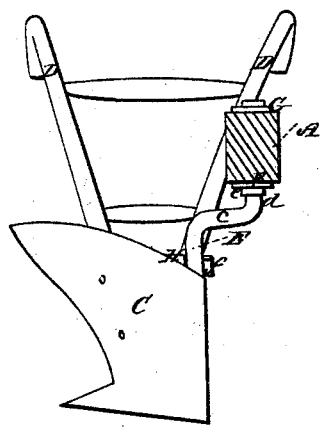

Figure 1 is a side view of my invention; Fig. 2, a front view of the same, the beam being in section, as indicated by the line $xx$, Fig. 1.

Similar letters of reference indicate like parts.

The object of this invention is to obtain a plow of simple construction which will not admit of weeds and trash collecting and wedging in between the beam and mold-board, a contingency of frequent occurrence in ordinary plows, and which occasions considerable difficulty and annoyance.

A represents the beam of the plow, B the landside, C the mold-board, and D D the handles. These parts may be constructed in the usual way.

E represents the standard, which is connected to the landside and beam. This standard may be constructed of either wrought or cast iron. It has an oblong slot, $a$, made in its lower end, through which a screw-bolt, $b$, passes into the landside. The standard projects vertically upward to about a level with the top of the mold-board, and it then extends horizontally outward at the land side of the plow, say, about four (4) inches, as shown at C, in Fig. 2, and then extends vertically upward about one and one-half (1½) inch, as shown at $d$, and is attached to a metal bar, F, which is secured by screw-bolts $e$ to the under side of the beam, said bolts passing through transverse oblong slots in the bar F, through the beam, and a plate, G, on the top of the beam. The standard E is braced from the mold-board C by means of an angle-bracket, H, which is near the top of the mold-board, a single bolt, $f$, passing through the standard E and the angle-bracket.

The standard E, just above the landside C, is provided with an inclined projecting bar, I, to which the lower end of the left-hand handle D is attached, as shown in Fig. 1. By this arrangement it will be seen that the beam A extends over to the left side of the mold-board and some distance above it, and weeds and trash are prevented from gathering and wedging in between the beam and mold-board. They will either be turned over into the furrow by the mold-board or pass over to the left or land side of the plow. The inclined bar I, to which the handle is attached, also prevents weeds and trash from collecting between the standard and handle.

By loosening the bolt $b$, which secures the lower end of the standard E to the landside, the front end of the beam may be adjusted vertically, so as to give the share a greater or less tendency to penetrate into the earth, and by loosening the screw-bolts $e$ the beam may be adjusted laterally, so as to give the plow more or less land, the transverse oblong slots in the bar F admitting of this adjustment.

Having thus described my invention, I claim as new and desire to secure by Letters Patent—

1. The bent standard E, applied to the plow, substantially as shown, so as to admit of the beam being a requisite distance above the mold-board and to the left of the landside, for the purpose herein set forth.

2. Attaching the lower end of the standard to the landside by means of a bolt, $b$, passing through an oblong slot in the standard, for the purpose of adjusting the beam in a vertical plane to regulate the depth of the penetration of the plow, as specified.

JOSHUA PIERPONT.

Witnesses:
J. M. CAMPBELL,
THOS. J. CAMPBELL.